United States Patent [19]

Brussels

[11] 4,167,178
[45] Sep. 11, 1979

[54] STATIONARY TYPE SOLAR ENERGY COLLECTOR APPARATUS

[75] Inventor: Nathan E. Brussels, Cherry Hill, N.J.

[73] Assignee: Solar Energy Systems, Inc., Burlington, N.J.

[21] Appl. No.: 810,015

[22] Filed: Jun. 27, 1977

[51] Int. Cl.² .................................................. F24J 3/02
[52] U.S. Cl. .................................... 126/438; 126/446; 126/450
[58] Field of Search ................................ 126/270, 271

[56] References Cited

U.S. PATENT DOCUMENTS

| | | | |
|---|---|---|---|
| 1,014,972 | 1/1912 | Nichols | 126/271 |
| 3,464,402 | 9/1969 | Collura | 126/271 |
| 3,951,128 | 4/1976 | Schoenfelder | 126/271 |
| 3,957,030 | 5/1976 | Davis | 126/270 |
| 3,990,430 | 11/1976 | Robertson | 126/271 |
| 3,994,279 | 11/1976 | Barak | 126/271 |
| 4,011,855 | 3/1977 | Eshelman | 126/270 |
| 4,059,093 | 11/1977 | Knowles et al. | 126/271 |

*Primary Examiner*—Carroll B. Dority, Jr.
*Attorney, Agent, or Firm*—Lerner, David, Littenberg & Samuel

[57] ABSTRACT

A hybrid collector for collecting solar energy comprised of a plurality of parabolic reflectors cooperating with tube/fin type fluid carrying collector elements, selective ones of which are arranged at the focal points of the parabolas. Additional tube/fin elements are positioned at a spaced distance above the boundary line between adjacent parabolic reflectors. The exterior surfaces of the tube/fin collector elements are treated preferably with a selective coating to provide high absorptivity and low emissivity. The surface areas of the tube/fin elements are also reduced to further contribute to a reduction in emissivity to optimize total absorptance. Location of the tube/fin elements which are off the parabolic reflector focal points cooperate with those located at the focal points to absorb diffuse energy while the tube/fin elements at the focal points absorb beam energy providing for both absorption of beam energy on clear sunny days and absorption of diffuse energy on cloudy or overcast days. The positioning of the tube/fin collectors well above the reflectors takes advantage of convection currents to increase energy transfer by reduction of energy loss. The structure provides the above functions through a fully stationary mounting. The parabolic reflector structures comprise flexible reflector sheets mounted within supporting troughs which are adapted to slideably receive the reflective sheets and urge the sheets into perfect parabolic configurations due to the geometry and interrelationship of the troughs and the reflective sheets, yielding a perfect parabolic reflector produced in an inexpensive manner.

13 Claims, 9 Drawing Figures

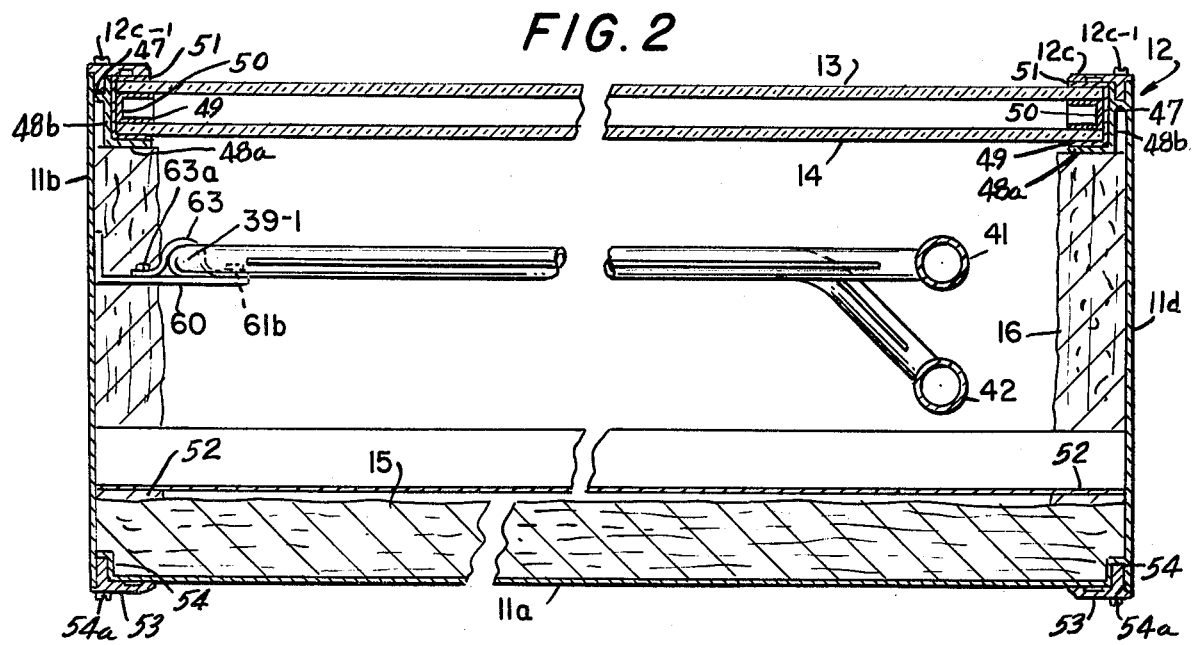
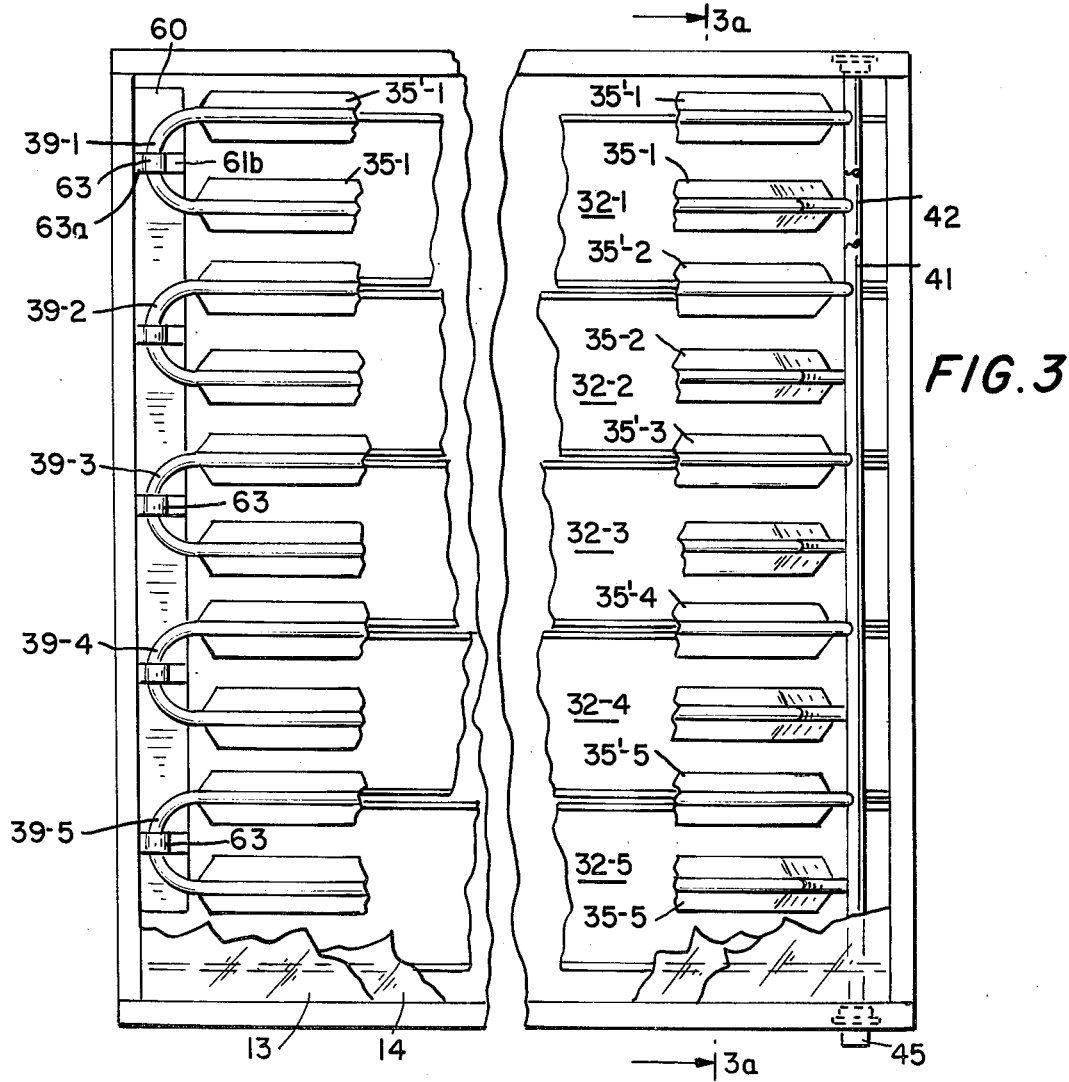

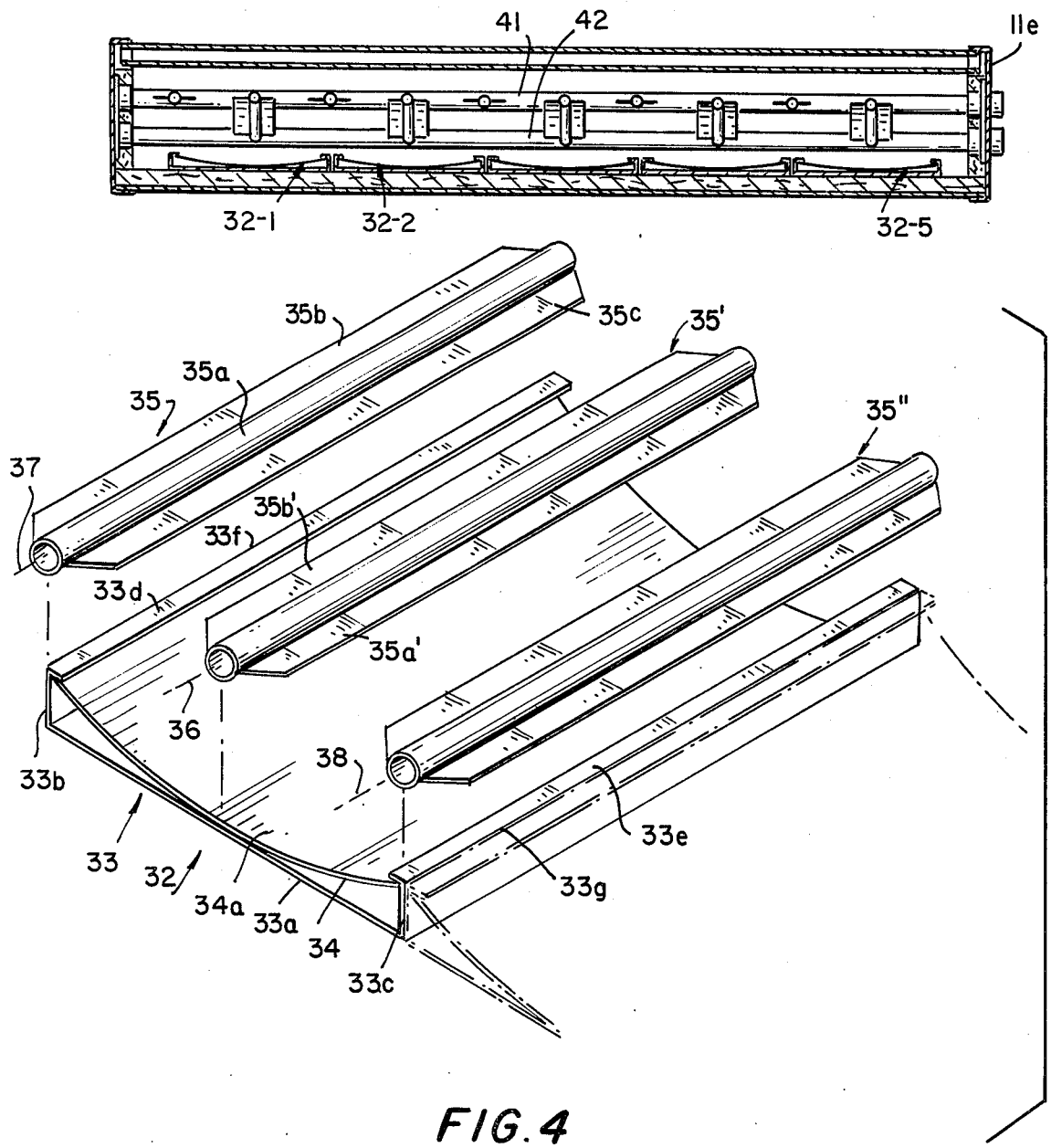
FIG. 3a
FIG. 4
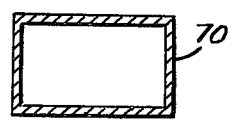
FIG 4a

STATIONARY TYPE SOLAR ENERGY COLLECTOR APPARATUS

BACKGROUND OF THE INVENTION

The recent emphasis on both environmental protection and energy conservation has caused a significant increase in both the popularity and importance of solar energy systems, especially since radiant solar energy constitutes an enormous energy source which is relatively untapped by today's standards and which can be utilized without the undesirable environmental side effects occurring in the production of energy through the burning of conventional fuel sources.

One typical solar energy collector system employs reflector means to concentrate beam energy (i.e. direct rays of solar radiation) upon fluid carrying means positioned at the focal point of the reflector. These systems have the drawback of generally requiring the capability of tracking the sun, necessarily increasing the cost of such systems and further having the disadvantage of significantly reducing efficiency of the energy absorbed as a result of overcast or cloudy conditions which serve to convert beam energy into diffuse energy (i.e. radiation which consists of randomly distributed rays) which are incapable of being reflected and concentrated upon the fluid carrying element.

Another general type of solar energy collector is the solar panel which is comprised of a metallic panel or sheet adapted to absorb radiation from the sun's rays in the form of beam and/or diffuse energy. Fluid carrying tubes are positioned beneath the panel and by means of conduction, the heat energy absorbed by the panel is conducted to the tubes and transferred to the fluid carried therethrough, which fluids are then directed to a utilization means in the form of a hot water tank, swimming pool, hot water heating system and the like.

Solar panel type energy collectors suffer from the disadvantages of continually changing efficiency as the sun changes its position relative to the earth, which may be remedied by expensive tracking means; and large heat losses (i.e. high emissivity) due to the large surface area of the absorptive panel. Also, convection losses further serve to reduce the efficiency of panel type solar collectors.

BRIEF DESCRIPTION OF THE PRESENT INVENTION

The present invention relates to solar energy collectors and more particularly to a solar energy collector of the hybrid type which provides a high level of efficiency for the absorption of both beam type and diffuse type solar radiation.

The present invention is characterized by comprising a series of parabolic reflectors arranged within an insulated enclosure. One tube/fin type element is arranged at the focal point of each parabolic reflector and is adapted to absorb beam type radiant energy striking the parabolic reflector and reflected and concentrated upon the tube/fin element located along the focal line. Additional tube/fin elements are arranged a spaced distance above the boundary line between adjacent parabolic reflectors oriented so as to receive some of the reflected beam energy and cooperating with the tube/fin elements located at the focal points absorbing diffuse radiation. The positioning of all of the tube/fin elements a spaced distance from the reflectors takes advantage of heat energy directed thereto as a result of convection currents set up within the enclosure to absorb such energy and thereby reduce heat energy loss and increase the absorption efficiency of the system.

Since maximum heat energy transfer occurs when the radiation rays are normal to the tube/fin elements, the tube/fin design further improves the absorption efficiency.

The central portions of the tube/fin elements are all hollow, tubular members and have their first ends connected to a pair of manifold tubes in an alternating pattern. The opposite ends of adjacent pairs of tube/fin elements are connected in common, the tube/fin elements being arranged in a U-shaped pattern.

The elements are housed within an insulated metallic enclosure covered with two sheets of glass which serve to reduce wind and convection loss for the radiant energy which has entered into the enclosure.

The solar collector assembly is mounted to face the south +20°. The panel is elevated with respect to the horizontal so as to be equal to the local latitude (+10°) in the heating season and (−20°) in the cooling season. The parabolic reflectors and cooperating tube/fin elements located at the focal lines thereof are designed to achieve an FOV of + or −10° from the axis of the parabolic reflector so as to fully compensate for the changing position of the sun relative to the earth without the need for providing a troublesome and expensive tracking mechanism.

The collector manifold carries water under pressure so as to achieve a flow of the order of 0.5 gpm, for example, while the pressure level is typically of the order of 10 psi which has been found to be sufficient to assure equal and uniform fluid flow through all of the fin tubes. Under normal operation conditions, it has been found that each collector assembly increases fluid temperature an amount of the order of 20°, collector assemblies connected in common thereby increasing the temperature of the fluid flowing through such collector assemblies in serial fashion being increased in increments of 20° to an upper level of the order of 130°, wherein the incremental increases in temperature level begin to taper off.

OBJECTS AND BRIEF DESCRIPTION OF THE FIGURES

It is, therefore, an object of the present invention to provide a novel, solar energy collection system capable of absorbing solar energy of both the beam and diffuse types.

Still another object of the present invention is to provide a novel stationary solar energy collector of a hybrid design utilizing parabolic reflectors and cooperating fin/tube elements for absorbing solar energy of both the beam and diffuse types and and capable of absorbing solar radiation at high levels of efficiency without the need for complex tracking and moving devices.

Still another object of the present invention is to provide a novel solar energy collector assembly in which the parabolic reflectors and tube/fin elements utilized therein are arranged in a manner which takes advantage of convection currents set up within the assembly housing to further increase energy absorption.

Still another object of the present invention is to provide a novel method and structure for inexpensively forming parabolic reflectors of ideal parabolic shape.

The above as well as other objects of the present invention will become apparent after reading the accompanying description and drawings in which:

FIG. 2 shows an elevational view, partially sectionalized, of the embodiment of FIG. 1 in which certain of the elements contained therein are shown in greater detail.

FIG. 3 shows a top plan view of the solar energy collector assembly of FIG. 1.

FIG. 3a shows an elevational sectional view of the assembly of FIG. 3 looking in the direction of arrows 3a—3a.

FIG. 4 shows a diagramatic simplified view of the elements associated with each parabolic reflector as employed in the assembly of FIG. 1.

FIG. 4a shows a cross-sectional view of an alternative collector tube which can be used in accordance with the present invention.

DETAILED DESCRIPTION OF THE INVENTION

Figure 1:
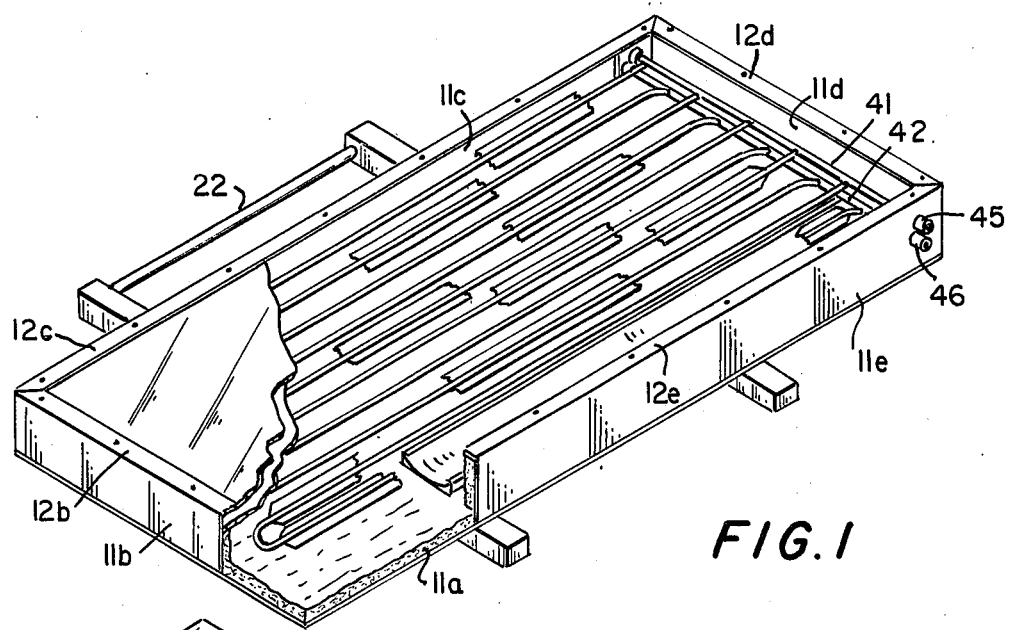
FIG. 1 shows a perspective view, partially sectionalized, of a solar energy collector assembly designed in accordance with the principles of the present invention.
Figure 1A:
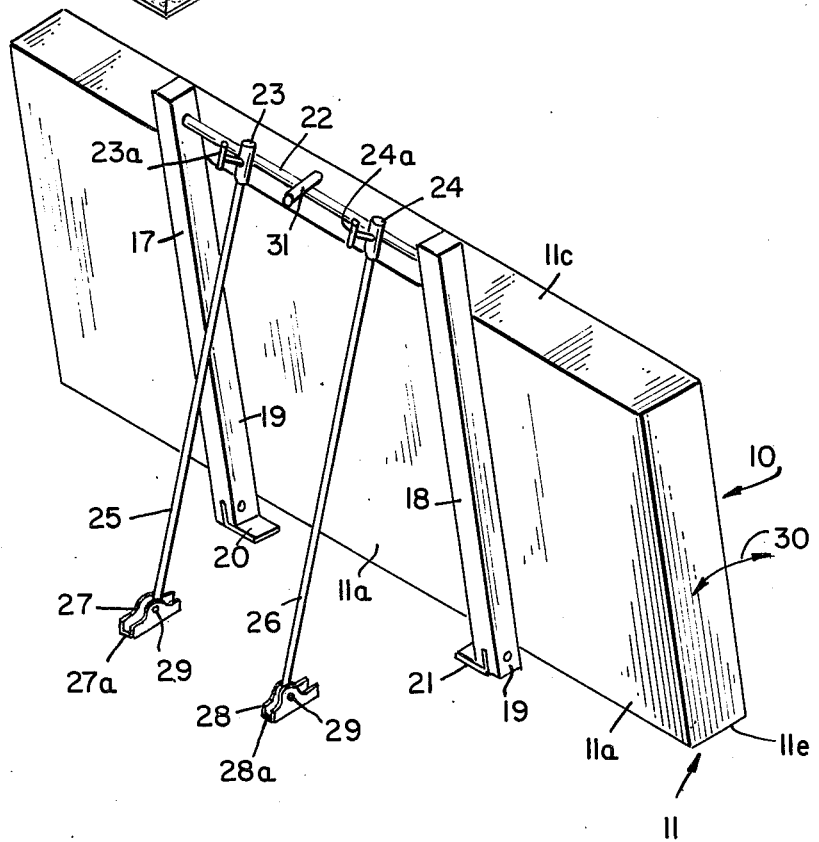
FIG. 1a shows a rear elevational view of the assembly of FIG. 1 and the manner in which the structure is arranged in an elevated fashion.

The collector assembly 10 of the present invention as shown in fully assembled fashion in FIGS. 1 and 1a, is comprised of a box-like housing 11 open along one side thereof and having a base portion 11a and sides 11b through 11e integrally joined thereto and extending at right angles therefrom. The open end is framed in the manner shown best in FIG. 2 by a clamp 12 receiving a pair of spaced parallel glass plates 13 and 14 which seal the housing but nevertheless provide ingress for solar radiation.

The clamp 12, from a consideration of FIG. 1, can be seen to be comprised of four clamp portions 12b through 12e, arranged along the upper perimeter of each of the sides 11b through 11e, respectively.

A sheet 15 of insulation is positioned across the interior surface of housing base 11a and similar sheets 16 are positioned against the interior surfaces of the vertical sides 11b through 11e, one such sheet being shown in FIG. 2.

The assembly 10 is designed for mounting on a horizontal surface and can be mounted at ground level or upon a structure of either horizontal or of a sloping or even vertical orientation. The panels are arranged so that the open end faces south +20°. The elevation of the collector assembly with respect to the horizontal should be equal to the local latitude (+10°) in the heating season and (−10°) in the cooling season.

FIG. 1a shows one preferred mounting structure for assembly 10 which structure is comprised of a pair of elongated bars 17 and 18 secured to the exterior of base 11a and extending beyond sides 11c and 11e, respectively. The lower ends of bars 17 and 18 are provided with suitable openings (not shown) for receiving fastening members 19, each of which extends through one of the openings and through cooperating openings in pivoting supports 20 and 21 which may, for example, be a pair of U-shaped brackets having their yoke portions secured to the mounting surface and provided with openings for receiving the fastening pin which serves a pivotal means for pivotally mounting bars 17 and 18.

A spanning rod 22 has its opposite ends pivotally mounted within bearings provided in bars 17 and 18 near their upper ends, said rod being provided with first and second hollow cylindrical shaped collars 23 and 24 fitted with linking members 23a and 24a, respectively.

A pair of elongated rods 25 and 26 are provided at their lower ends with openings which are aligned with openings provided in U-shaped supports 27 and 28 respectively, each receiving a fastening pin 29. The fastening pins 29 extend through the openings in U-shaped supports 27 and 28 and through the coaligned openings provided near the bottom ends of rods 25 and 26 to pivotally mount said rods. The yoke portions 27a and 28a of the support brackets 27 and 28 are adapted to receive fastenings members to secure the brackets to the supporting surface.

The upper ends of rods 25 and 26 extend through the hollow openings of collars 23 and 24, respectively. By virtue of the rotatable mounting of rod 22 and the pivotal mounting of bars 17 and 18 and rods 25 and 26, together with the slideable arrangement of rods 25 and 26 through collars 23 and 24, respectively, it is quite simple to adjust the angle of orientation of the assembly 10 which is capable of being swingably moved about pivot pins 19 either in the clockwise or counterclockwise direction as shown by arrows 30. Once the appropriate orientation is obtained, the locking members 23a and 24a which have operating handles as shown, may be tightened to secure the assembly in the appropriate position. Readjustment may be made simply by loosening the locking members readjusting and retightening. In order to provide the proper orientation, a "sighting" member 31, secured to the exterior surface of side wall 11c, may be provided which member is nothing more than a hollow elongated cylindrical member to enable "sighting" of the sun therethrough at the appropriate time of day to assure proper elevational orientation of assembly 10.

The interior of collector 10 is provided with a plurality of parabolic assemblies, one of which is shown in detail in FIG. 4, the parabolic assembly 32 being comprised of a trough-like supporting member 33 having a base portion 33a and a pair of upright arms 33b and 33c. The arms 33b and 33c are bent to form inwardly directed flanges 33d and 33e. The reflector portion of the parabolic reflector is comprised of a sheet 34, preferably of a metallic material, and having its concave surface 34a provided with a highly polished reflective surface.

A plurality of tube/fin elements 35 are arranged a spaced distance above parabolic reflector 32 so that the central member 35' has its longitudinal axis 36 lying along the focal line for the parabolic reflector.

Each of the tube/fin elements is comprised of a hollow elongated tubular portion 35a having a pair of integrally formed fins 35b and 35c extending therefrom and integrally joined therewith and lying along the diameter of the tubular portion so as to lie in a common plane. The remaining tube/fin elements 35 and 35" are identical in design and a detailed description thereof will be omitted for purposes of simplicity.

The tube/fin elements 35 and 35" are positioned on opposite sides of the middle tube/fin element 35' and their longitudinal axes 37 and 38 arranged in spaced parallel fashion so as to be aligned with the associated longitudinal edges 33f and 33g of the parabolic reflector.

The tube/fin elements, in the preferred embodiment, are adapted to have water or any other suitable fluid flow through the hollow tubular elements so as to have transferred thereto the energy absorbed by the tube and the fins. The exterior surface of the tube and the fins is preferably treated with a black anodized coating or a selective coating adapted to yield a tube/fin element having high absorptivity and low emissivity to absorb transfer solar energy to the tube/fin element at very high efficiency whereupon the energy transferred thereto is conducted through the tube/fin element to the fluid which is heated thereby.

The fluid flowing therethrough is then delivered to a suitable utilization means.

The assembly as shown in FIG. 4 is adapted to provide for the collection of solar energy of both the beam and diffuse type at high efficiency. In the case of beam type energy, radiation striking the reflective surface 34a is directed towards the focal point of the parabolic reflector at which location the tube/fin element 35 is positioned. Thus, the reflective energy is directed to and concentrated upon the bottom surfaces of fins 35b and 35c as well as the bottom portion of the exterior surface of tube 35a. Since some radiation will strike the top surfaces of fins 35a and 35b as well as the top portion of the exterior surface of tube 35a, additional energy will be absorbed in this manner. This is likewise the case for tube/fin elements 35' and 35".

Beam energy is captured on clear sunny days whereas on cloudy or overcast days, the cloud or other cover tends to randomly diffract beam energy converting it into diffuse energy. Under such circumstances, the parabolic reflectors do not function at a high level of efficiency. However, the centrally located tube/fin element 35 cooperates with the side-by-side elements 35' and 35" to collect the diffuse radiation primarily on the upper surfaces of their fins and tubes.

As was discussed hereinabove, the open end of the housing is fitted with a pair of transparent sheets which serve to appreciably reduce the convective effects within the collector and further reduce cover losses. In a preferred embodiment, the outer cover is preferably tempered glass while the inner cover may be transparent plastic, such as pvf, plastic film, although both plates may be glass, if desired.

The rays of solar energy passing through the transparent cover members and entering into the housing interior are either absorbed or reflected, the largest percentage of rays being absorbed. The deflected rays reflected outwardly toward the transparent members are typically oriented at an angle relative to the glass plates to again be reflected and thereby be caused to remain within the housing, further increasing the absorption efficiency.

The heating of the tube/fin elements and to some extent, the parabolic reflectors, serve to create convection currents within the housing. By locating the tube/fin elements a spaced distance above the parabolic reflector assemblies, the upward flow of convection currents impinges upon the tube/fin elements to inject additional heat energy to the tube/fin elements and ultimately to the fluid passing therethrough.

Considering FIGS. 3 and 3a, there can be seen to be five such parabolic reflector structures 32-1 through 32-5 contained within the housing. The tube/fin elements 35-1 through 35-5 are arranged along the focal line of the parabolic reflectors 32-1 through 32-5, respectively.

The tube/fin elements 35'-1 through 35'-5 are arranged at the boundaries between adjacent parabolic reflectors as shown. Considering the orientation of FIG. 3, the left-hand ends of adjacent pairs of the tube/fin elements are joined to provide one continuous flow path for the fluid. For example, the left-hand end of tube/fin elements 35'-1 is joined to element 35-1 by the U-shaped tube portion 39-1. The remaining pairs are joined by the U-shaped tube portions 39-2 through 39-5 as shown.

The U-shaped portions 39-1 through 39-5 are all supported upon an elongated bracket of L-shaped configuration and having an arm 61 secured to the interior surface of side wall 11b as shown best in FIG. 2. The resilient spring-like hold down clamp 63 has a first arm 63a secured to arm 61b and snaps over the U-shaped portion 39-1 to maintain the tube/fin elements in rest position upon the supporting arm 61b.

The right-hand ends of the tube/fin elements are connected to the supply and return headers 41 and 42, respectively. Considering FIGS. 1 and 3a, the right-hand end of supply header or tube 41 extends through an opening in side wall 11e for connection to a suitable conduit adapted to introduce fluid under pressure into the supply header 41. Typically, the pressure is of the order of 10 psi and the flow is preferably within the range of one-half to one gallon per minute.

The supply header 41 is coupled in common to the right-hand ends of the tube portions of tube/fin elements 35'-1, 35'-2, 35'-3, 35'-4 and 35'-5. Thus, fluid under pressure enters through supply header 41 and passes into the right-hand ends of tube/fin elements 35'-1 through 35'-5. The fluid passes along the length of these tube elements, passes through the U-shaped portions 39-1 through 39-5 and then moves in the right-hand direction, passing through the tubes of tube/fin elements 35-1 through 35-5, whose right-hand ends are coupled to return leader or tube 42. As can best be seen from FIG. 2, the headers 41 and 42 are arranged with their longitudinal axes lying along an imaginary vertical line 44. Thus, the right-hand ends of tube/fin elements 35-1 through 35-5 are bent downwardly as to be aligned with return header 42. For example, considering FIG. 2, the right-hand end 35-4a of tube/fin fin element 35-4 is bent downwardly so as to be joined with return header 42. Fluid flow continues through the tube/fin elements 35-1 through 35-5 to the return header which is aligned with opening 46 in the side wall 11e to be coupled to an energy utilization source.

As is best shown in FIGS. 1 and 3, the supply and return headers have their opposite ends communicating through openings provided in side wall 11c so as to be adapted for joining with additional assemblies 10 for installations in which a plurality of such solar collectors are to be utilized. In the event that only a single solar collector 10 is utilized or in the event that the solar energy collector for example as shown in FIG. 1 is the last of a series of collectors connected with one another, the opposite ends of the supply and return headers may be sealed with a suitable plug member. Alternatively, an air release mechanism may be provided thereat to release any air in the lines to the atmosphere, while preventing liquid from escaping.

Considering FIG. 2, some of the details of construction are shown therein wherein side wall 11d, which is preferably an extruded member, is provided with a short projection 47 upon which is integrally joined an L-shaped projection comprised of arms 48a and 48b.

Arm 48a serves as support for the gasket 49 which has a U-shaped cross-section for embracing the marginal edge of plate 14. A spacer 50 is positioned between gasket 49 and a second gasket 51 having a U-shaped cross-sectional configuration which embraces plate 13. Arm 48b and the upper end of side wall 11d form a narrow slit which receives a self-tapping screw 12c-1 extending downwardly from the frame member 12c to secure the frame member to the side wall and hence firmly secure the gaskets, spacer and transparent plates in position.

The projection 52 provided along side wall 11d extends outwardly from the side wall 11d and, together with projection 48a, serves as a means for positioning and supporting the insulation sheet 16. Projection 52 also cooperates with housing base sheet 11a to serve as a means for embracing the insulation sheet 15. Substantially L-shaped projection 53 extends outwardly from the side wall 11d near the bottom end thereof and forms a narrow recess which cooperates with a flange portion 54 to receive and embrace the right-hand marginal edge of base sheet 11a. Self-tapping screws 54a extend through frame 54 and sheet 11a and cut into the side walls of the narrow recess to firmly secure the base sheet 11a to the side wall.

The relationship of the focal length of the parabolic reflectors to their diameter (f/d) were found to produce diffuse radiation which redirected the energy beyond the rear surface of the focal collection tube/fins due to the diffuse radiation caused by atmospheric effects and reflection at the parabola. Based upon these findings, it was found that the collection tube at the focus of the parabola must have sufficient intercept area to accommodate the diffusion effect. In addition thereto, it was discovered that a collection tube having a circular cross-section produced a specular effect in which the incident energy striking the tube at angles deviating from the normal to the surface of the tube were only partially absorbed, the amount of absorption being a function of the resultant component normal to the tube. It was found that a collector tube of square or rectangular cross-section, such as for example, the collector tube 70 shown in FIG. 4a, provided excellent characteristics for absorbing solar radiation. However, due to the high costs and complexity in fabrication, assembly and the like, it was found that the tube/fin element 35 described hereinabove has equivalent, if not superior, energy absorption characteristics as well as providing increased intercept surface area, thereby resulting in excellent energy absorption and heat transfer to the fluid.

Figure 5:
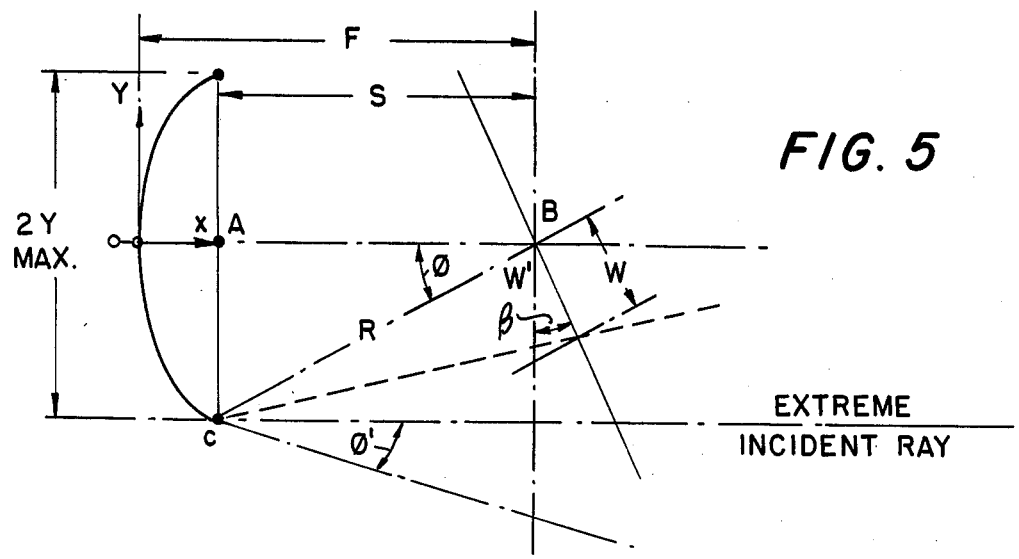
FIGS. 5 and 6 show schematic views of the reflector of FIG. 4 useful in explaining the design of the reflector.

In order to be further assured that energy is collected at a high level of efficiency, it is important to provide a parabolic reflector which comes as close to a perfect parabolic shape as is possible. FIG. 5 shows the geometric relationships desired for the collector geometry to accommodate beam and diffuse solar radiation components.

The equation for the parabola is:

$$y^2 = 4Fx \quad \text{or} \quad x = \frac{y^2}{4f} \quad \text{where } X \text{ may} = OA$$

$$\tan \phi = \frac{Ym}{S} \quad \text{where} \quad F - X = s$$

$$F - \frac{Ym^2}{4f} = s$$

$$\tan \phi = \frac{Ym(4f)}{4F^2 - Ym^2} \quad \text{For } Ym = 3''$$

$$\tan \phi = \frac{12F}{4F^2 - 9} \quad \text{or a function of Focal Length}$$

For $F = 2$      For $F = 3$ $\tan \phi_2 = \frac{24}{7} = 3.42$    $\tan \phi_2 = \frac{36}{27} = 1.33$ $\phi_2 = 73.7°$      $\phi_3 = 53°$ $R \cos \phi = s$ $R = \frac{S}{\cos \phi}$ $R = \frac{.875}{0.28} = 3.125''$    $R = \frac{2.25}{0.6} = 3.75''$ Let $\theta'$ = Deviation of the Extreme Ray from the Normal For Small Angles
$W = R\theta'$ and $W'$ is the intercept Distance from Point B of the Deviated Ray and $W' \cos B = W$
Where $\angle B = \phi - \theta'$ $W = R\theta'/\cos(\phi - \theta')$ Let $\theta' = 10° = 0.174$ Rad.

$W' = \frac{3.125 (.174)}{\cos (73.7 - 10)}$    $W' = \frac{3.75 (.174)}{\cos (53 - 10)}$ $W' = 1.22''$ (for $\phi_2 = 73.7°$)    $W' = .88''$ (for $\phi_3 = 53°$)

The focal length then must be at least 3" to obtain a F.O.V. of $\pm 10°$ to maintain a reasonable concentration ratio.

Let $K = 6/2W' = 6/1.5 = 4$

Increasing the Focal length Beyond 3" causes the Depth of the Collector to Become Excessive. Concentrator will be a Cylindrical Parabola, $$\frac{f}{d} = .5 \text{ with } d + 2_y \max = 6''$$

$$F.O.V. \cong \pm 10°$$

Figure 6:
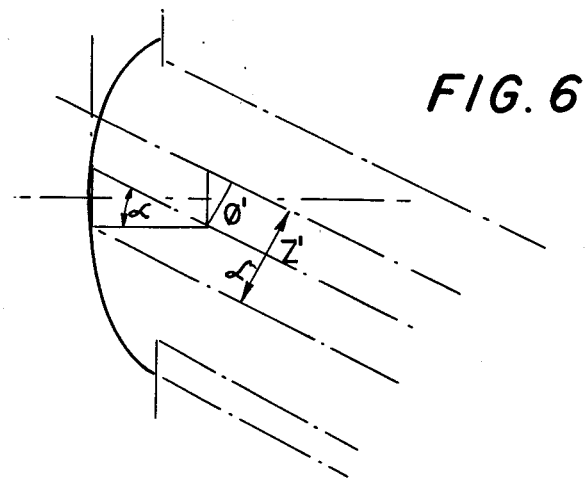

FIG. 6 shows the geometry utilized for the diffuse component.

For rays beyond 10° the parabola will not illuminate the rear surface of the focal absorber but will capture beam component rays within Zone Z which represents a small % of the total capture area. See FIG. 6.

The concentrator should be positioned with the parabola axis at the mean sun elevation in May and August. (55° in May and 50° in August.)

For rays off axis in the azimuth direction the effective ray will be that component near normal to the cover face with the reflector oriented due south from 9:00 am to 3:00 pm an azimuth variation of $\pm 70°$ 45° N Lat. would occur.

Reflection from the face of the glass will be severe at this angle.

The Brewster angle $\theta = \tan^{-1} \frac{(n')}{n}$

For air $n \cong 1$    For Glass $n' \cong 1.5$ $\theta p \cong 57°$ which essentially is the angle at which reflection increases rapidly towards total reflection at the glass face. Therefore, the collector efficiency will fall off rapidly beyond $Az = \pm 70°$.

Fabrication of the parabola has been accomplished by employing a sheet of material for the reflector member which is of a gauge so as to have a good flexibility. The trough is designed with a pair of substantially U-shaped flanges 33d' and 33e' as shown best in FIG. 4a in order to form a pair of U-shaped slots for receiving the free edges 34b and 34e of sheet 34. The relative positioning of the slots formed by flanges 33d' and 33e' and their height above the base 33a of the trough are chosen so as to cause the reflective sheet to naturally form the shape of a perfect parabola as the sheet is slid into one end of the trough so as to be moved into longitudinal alignment with the trough. This approach, although highly simplified from the point of view of manufacture and assembly, has nevertheless been found to yield a nearly perfect parabolic reflector by providing a significant improvement over prior art reflectors which require expensive machining and/or tools and dyes for their fabrication.

The relationship between the geometry and dimensions of the trough and the width of the sheet required to form a nearly perfect parabolic reflector is determined as follows:

By the equation given for the arc length of a parabola, for example as set forth at page 104 of the Mechanical's Engineer Handbook, published 1951 by McGraw Hill book company, the relationship between the arc length, the depth d'T of the trough shown in FIG. 4 and the width w'T can be determined. Once a parabolic reflector of suitable size is selected, a trough whose dimensions are determined as set forth hereinabove is formed of a suitable metal so as to be provided with a base portion 33a having upstanding sides 33b and 33c and inwardly bent flanges 33d and 33e. In one preferred embodiment, for example, utilizing a reflector sheet having a width of 6" when laying flat, and a trough having a depth d'T equal to 0.75", the w'T of the trough is 5.844 inches. The trough is fabricated very simply by bending the parabolic reflector element into a curvature and inserting the curved parabolic reflector into one end of the trough until its left- and right-hand ends are aligned with and slideably the left- and right-hand ends of the trough. The parabolic reflector is formed of a metal of a suitable gauge so as to provide adequate flexibility. This arrangement thereby assures the provision of a perfect parabolic reflector without the need for the type of complex machining and/or dies or molds required in prior art structures.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A solar energy collector for collecting and absorbing solar energy in the form of both beam type and diffuse type radiation comprising:
  a housing having one transparent side;
  a parabolic reflector within said housing facing said transparent side for reflecting beam type radiation passing through said transparent side;
  an elongated fluid carrying element having its longitudinal axis substantially aligned with the focal line of said parabolic reflector, said elongated fluid carrying element being hollow and having a first substantially planar surface facing said parabolic reflector to receive and absorb radiation reflected from said reflector, said elongated fluid carrying element comprising a first fluid carrying element, and second and third fluid carrying elements positioned parallel to and on opposite sides of said first fluid carrying element, said second and third fluid carrying elements each having a first flat surface remote from said reflector and positioned over the longitudinal side edge thereof for collecting and absorbing diffuse type solar radiation passing through said transparent side and a second flat surface facing said parabolic reflector for absorbing heat resulting from convection currents developed between said fluid elements and said parabolic reflector.

2. The apparatus of claim 1 wherein said elongated fluid carrying elements each has a second substantially planar surface parallel to said first planar surface and arranged to receive and absorb diffuse radiation passing through said transparent side of said housing.

3. The apparatus of claim 2 wherein said first and second planar surfaces are covered with a coating for absorbing solar radiation at a high level of efficiency.

4. The apparatus of claim 2 wherein said elongated fluid carrying elements have a rectangular cross-sectional configuration.

5. The apparatus of claim 2 wherein said elongated fluid carrying elements further comprise a hollow tube having at least one radially aligned fin extending outwardly from and integral with said tube.

6. The apparatus of claim 1 further comprising means for introducing fluid into one end of said elongated fluid carrying elements and means for delivering fluid exiting from the opposite end of said elements to an energy utilization means.

7. The apparatus of claim 1 wherein said housing transparent side comprises a pair of transparent sheets arranged in spaced parallel fashion and sealing means for sealing said sheets across the transparent side of the housing.

8. The apparatus of claim 1 further including supply and return manifolds for introducing fluid into said fluid carrying elements to be heated by radiation absorbed by said fluid carrying elements and for receiving and conducting said heated fluid to a heat energy utilization means.

9. The apparatus of claim 7 further comprising means for adjustably aligning the housing so that its transparent side is diagonally aligned relative to an imaginary horizontal plane at an angle chosen to optimize the radiant solar energy captured by said elements.

10. A stationary mounted solar energy collector means adapted to absorb solar energy without tracking the sun, said solar energy collector apparatus comprising:
  a box-like housing having one open side;
  transparent means in said open side for sealing said open side while permitting the passage of solar radiation therethrough;
  a plurality of parabolic concave reflectors mounted side-by-side within said housing, each of said concave reflectors facing said open side of said housing for reflecting beam type radiant energy passing through said open side and concentrating the reflected rays towards the focal line of said reflector;

a first plurality of elongated fluid carrying elements within said housing, each of said elongated fluid carrying elements having its longitudinal axis substantially aligned with one of said focal lines of said concave reflectors and having a substantially flat surface coated with a radiation absorptive coating for absorbing radiation directed thereto by said concave reflector;

a second plurality of fluid carrying elements each positioned in spaced parallel fashion and interspersed with said first plurality of fluid carrying elements, said second plurality of fluid carrying elements each having first substantially planar surfaces facing said concave reflectors, and said second plurality of fluid carrying elements lying a sufficient distance above said concave reflectors to enable said first substantially planar surfaces to absorb heat energy developed by convection currents created in said housing and above said reflectors; and means for introducing fluid into said first, second and third fluid carrying elements and means for withdrawing the fluid introduced into said first, second and third fluid carrying elements for delivery to a heat energy utilization means, said second plurality of fluid carrying elements arranged to overlie the longitudinal side edges of at least one reflector.

11. The apparatus of claim 10 further comprising U-shaped coupling means joining the ends of adjacent pairs of elements while the remaining ends are respectively coupled to said introducing means and said withdrawing means.

12. The apparatus of claim 11 wherein each of said elements comprises a hollow tube having at least one radially aligned fin extending outwardly from and integral with said tube.

13. The apparatus of claim 12 wherein the exterior surface of said elements are treated with a selective coating having a high absorptivity and a low emissivity of solar radiation.

* * * * *